United States Patent [19]

Fukuda

[11] Patent Number: 4,977,421
[45] Date of Patent: Dec. 11, 1990

[54] DOUBLE LIGHT BLOCKING SHUTTER

[75] Inventor: Tsuyoshi Fukuda, Kanagawa, Japan

[73] Assignee: Canon Kabushiki Kaisha, Tokyo, Japan

[21] Appl. No.: 412,332

[22] Filed: Sep. 26, 1989

[51] Int. Cl.$^5$ .............................................. G03B 9/40
[52] U.S. Cl. ..................................... 354/246; 354/249
[58] Field of Search ................ 354/246, 249, 248, 253

[56] References Cited

U.S. PATENT DOCUMENTS

| | | | |
|---|---|---|---|
| 4,114,174 | 9/1978 | Onda et al. | 354/249 |
| 4,829,329 | 5/1989 | Toyoda et al. | 354/246 X |
| 4,847,649 | 7/1989 | Toyoda et al. | 354/246 X |

Primary Examiner—Brian W. Brown
Attorney, Agent, or Firm—Fitzpatrick, Cella, Harper & Scinto

[57] ABSTRACT

A shutter having leading and trailing blade groups with an operating mechanism comprising a first drive member for the leading blade group, a second drive member for the trailing blade group, an energizing member movably supported to push the second drive member so that the shutter is given the driving power of a direction in which it runs, a moving member for moving the energizing member from a position where running of the shutter is completed to a position where the shutter is ready to run, and a mechanism for controlling the movement of the second drive member in accordance with movement of the moving member, wherein the mechanism moves the second drive member between a position where the leading and trailing blade groups both cover an exposure aperture of the shutter to effect double light-blocking, and a position where the aperture is covered by the leading blade group alone as the double light-blocking is cancelled.

15 Claims, 5 Drawing Sheets

DOUBLE LIGHT BLOCKING SHUTTER

BACKGROUND OF THE INVENTION

1. Field of the Invention:

This invention relates to improvements in a double light-blocking mechanism of a shutter.

2. Description of the Related Art:

Heretofore, in the field of focal plane shutters, there is known a shutter having an increased ability to block off light in which the aperture is blocked with a leading blade group and a trailing blade group, that is, a so-called double light-blocking shutter.

In one type of the double light-blocking shutter, just after the termination of the exposure, while the trailing blade group is covering the aperture, the leading blade group is moved to a position of covering the aperture, and the double light-blocking is cancelled when the film is wound.

Cameras in recent years generally have motor drive device incorporated therein, and the termination of the exposure is immediately followed by the film winding operation. Hence, the use of this type of double light-blocking shutter in such a camera lowers the significance of blocking light, as the double light-blocking is cancelled soon after the exposure has terminated.

Another type of double light-blocking shutter is adapted to the so-called motor drive device built-in camera, and is operated in such a manner that the termination of the exposure is followed by a charging operation which permits the trailing blade group to remain in the position of covering the aperture. From the time when the leading blade group gets fully charged, that is, when the charging is completed with the leading blade group, too, in the state of covering the aperture, actuation of the next camera release is waited for. When the camera release is actuated, the trailing blade group which has so far been held in the position of covering the aperture is then released. It is after the retracting of the trailing blade group from the aperture is completed that the leading blade group and the trailing blade group run at a predetermined timing to make an exposure.

However, even this latter type of shutter, when used in some photographic situations such as that described below, has a drawback.

That is, in such a camera, the interval from the moment at which the photographer has actuated a camera release to the moment at which the exposure starts is called the "release time lag". The shorter the release time lag, the closer the photograph can be taken to the moment the photographer has intended to shoot. Particularly, in sports photography or racing photography, the release time lag becomes a large obstacle in catching the decisive moment. With the above-described latter type of shutter, however, because the trailing blade group, after the release is actuated, is set to the retracted position, the sum of the time necessary for the trailing blade group to retract and the time it takes until the retracted trailing blade group becomes stable is unavoidably added to the release time lag. Therefore, such a device is unsuited to catch the decisive moment. Incidentally, to shorten the release time lag, it has been known that the reflex mirror is fixed so that the time it takes to move the mirror from the viewing position to the non-viewing position is romoved. In a camera of this kind, it is virtually impossible to incorporate the above-described latter type shutter.

Accordingly, it may be considered that the trailing blade group is made to retract before the actuation of the release in order to avoid the addition of the above-described time of retracting the trailing blade group to the release time lag. However, if, after the setting of the trailing blade group to the retracted position has been performed before the shutter release, the actuation of the camera release is interrupted, (it happens that the photographer, though having intended to shoot, gives it up because the scene has changed), the shutter will subsequently be operated to establish the double light-blocking again. For this purpose, a running completion state of the trailing blade group must be brought about. That is, the trailing blade group only is obliged to run as if another usual camera release were actuated, so that the running completion state of the trailing blade group is regained. And, after that, the charging operation must once more be carried out. Thus, the shutter is returned to the double light-blocking state. Such an action, because of its having, despite the interruption of a shooting prior to making of the exposure, to allow one of the blade groups to run, is accompanied with production of a sound as if the film were exposed after the shutter button is released from the half depression, so that the photographer is deceived. Further, because it is only the trailing blade group that has to run even when no exposure is made, as this is very often repeated, there will arise a possibility of occurrence of an accident due to the premature damage of the trailing blade group.

SUMMARY OF THE INVENTION

One aspect of this invention is to form a shutter in such a way that the movement of the trailing blade group for double light-blocking and for cancellation of the double light-blocking is controlled in response to movement of the charging member.

BRIEF DESCRIPTION OF THE DRAWINGS

FIG. 1 to FIG. 5 illustrate an embodiment of the invention, in which:

DETAILED DESCRIPTION OF THE PREFERRED EMBODIMENT

In FIGS. 1 to 5 there is shown one embodiment of the invention, where a shutter base plate 1 carries rotation shafts of a charge lever 2, drive levers 3 and 5 and other members, and has an aperture 1a bored therein. The charge lever 2 is arranged to turn in a clockwise direction as it is energized by a charge member (not showw) from the outside, and has leg portions 2a, 2b and 2c, a geared portion 2d and a stop foot 2e. The leading blade group drive lever 3 engages a leading blade group 10 at a foot portion 3b thereof and receives the energizing force a spring 3d to rotate in the clockwise direction. The lever 3 has another foot portion 3a for receiving a force from the leg portion 2a as the charge lever 2 turns in the clockwise direction and a projected portion 3c arranged to be held in engagement with a leading latch lever 4 when the charging is completed. The leading latch lever 4 arrests the leading blade group drive lever 3 at the time of completion of the charging and holds it (in the state of FIG. 4). At the time of a release, the lever 4 starts to be pushed at a foot portion 4a thereof by an actuating member (not shown) at a predetermined timing and turns in the clockwise direction to release the lever 3 from the aforesaid arresting connection, permitting the leading blade group drive lever 3 to turn. Thus the leading blade group 10 is caused to run. The trailing blade group drive lever 5 engages a trailing blade group 11 at a foot portion 5a thereof. A trailing blade group force-accumulating lever 6 receives the force of a spring 6d to get the energizing force for clockwise rotation. The lever 6 has a foot portion 6a arranged to be abuttingly engaged with the leg portion 2b when the charge lever 2 rotates in the clockwise direction and to receive the energizing force to rotate in the counterclockwise direction, another foot portion 6b arranged in abutting engagement with the trailing blade group drive lever 5 to give it the energizing force to drive the trailing blade group 11, and a projected portion 6c arranged to engage a trailing latch lever 9. Incidentally, the trailing blade group drive lever 5 and the trailing blade group force-accumlating lever 6 are urged by a spring 12 (see FIG. 3) to attract each other. A double light-blocking formation lever 7 rotates when the charge lever 2 rotates, while receiving the force at a geared portion 7b through a gear 8. The lever 7 has projected portion 7a arranged to be abuttingly engaged with the trailing blade group drive lever 5. The geared portion 7a receives the force in mesh with the gear 8. The gear 8 in mesh with the geared portions 2d and 7d transmits the power from the charge lever 2 to the double light-blocking formation lever 7. The trailing latch lever 9 is arranged in engagement with the projected portion 6c of the trailing blade group force-accumulating lever 6 to sustain the driving power received from the spring 6d (in the state of FIG. 4). While receiving a force at a projected portion 9a thereof from an actuating member (not shown) for the trailing blade group 11, the lever 9 turns in the clockwise direction to disengage from the lever 6, so that the trailing blade group 11 starts to run.

The operation of the shutter of such construction is described by using FIGS. 1 to 5.

Figure 1:
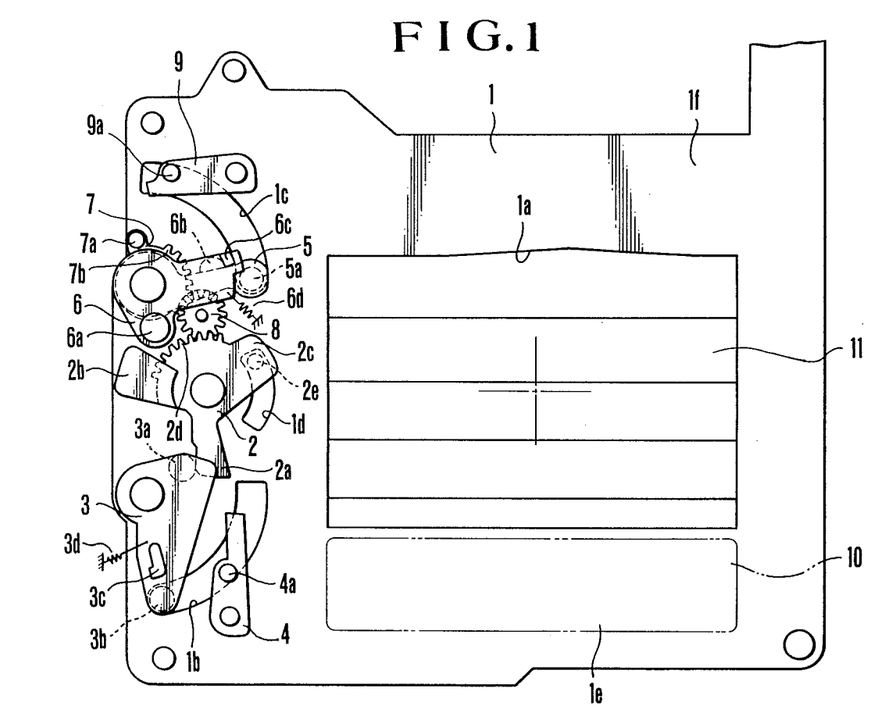
FIG. 1 is a front view of a shutter which is in the state of running completed.

FIG. 1 shows the state in which the running of the shutter is completed (or the exposure completion state). That is, the leading blade group drive lever 3 and the trailing blade group drive lever 5 lie in their running completion states where they are in abutting engagement with cutout portions 1b and 1c of the shutter base plate 1, respectively. At this time, the leading blade group 10 is in retraction from the aperture 1a, taking its place behind the lower portion 1e of the shutter base plate 1, while the trailing blade group 11 is in the position of covering the aperture 1a of the shutter base plate 1.

In the case of the motor drive built-in camera, it is the common practice that soon after the shutter has completed the exposure in such a state as in FIG. 1, charging of the shutter is started.

Figure 2:
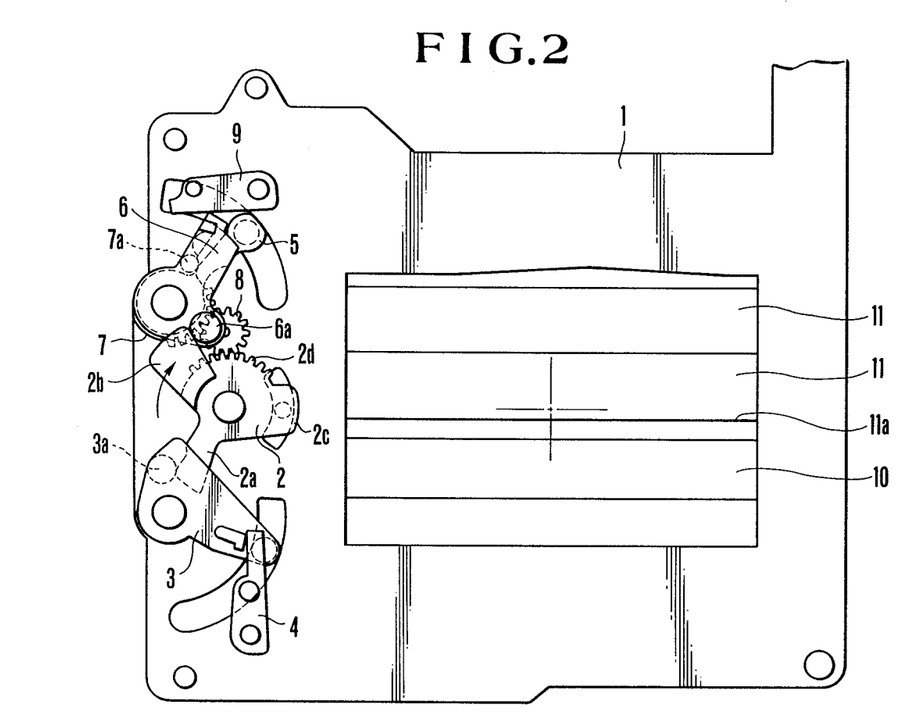
FIG. 2 is a front view of the shutter which is in the middle of charging.

Hence, the charge lever 2 receives the energizing force at its leg portion 2c from the charge member (not shown) and starts to rotate in the clockwise direction as shown in FIG. 2. When the clockwise rotation of the charge lever 2 starts, the leading blade group drive lever 3, because of the leg portion 2a engaging the foot portion 3a, starts to turn in the counterclockwise direction against the force of the spring 3d. Also, the leg portion 2b comes to abut on the foot portion 6a of the trailing blade group force-accumulating lever 6. The trailing blade group force-accumulating lever 6 then starts to turn in the counterclockwise direction against the force of the spring 6d. Incidentally, by means of the spring 12 (see FIG. 3), the trailing blade group drive lever 5 too is caused to follow up the motion of the trailing blade group force-accumulating lever 6. At this time, the geared portion 2d of the charge lever 2 rotates the gear 8 in the counterclockwise direction, causing the double light-blocking formation lever 7 to rotate in the clockwise direction from the position of FIG. 1. On the way, the foot portion 7a of the double light-blocking formation lever 7 abuts on the trailing blade group drive lever 5. Against the spring 12, from this time onward, the trailing blade group drive lever 5 moves away from the trailing blade group force-accumulating lever 6, is pushed by the double light-blocking formation lever 7 and starts to turn in the clockwise direction. Incidentally, reference numeral 11a denotes the slit forming end of the trailing blade group 11. And, as the clockwise rotation of the charge lever 2 advances, the state of FIG. 3 is reached at the time of completion of the charging.

Figure 3:
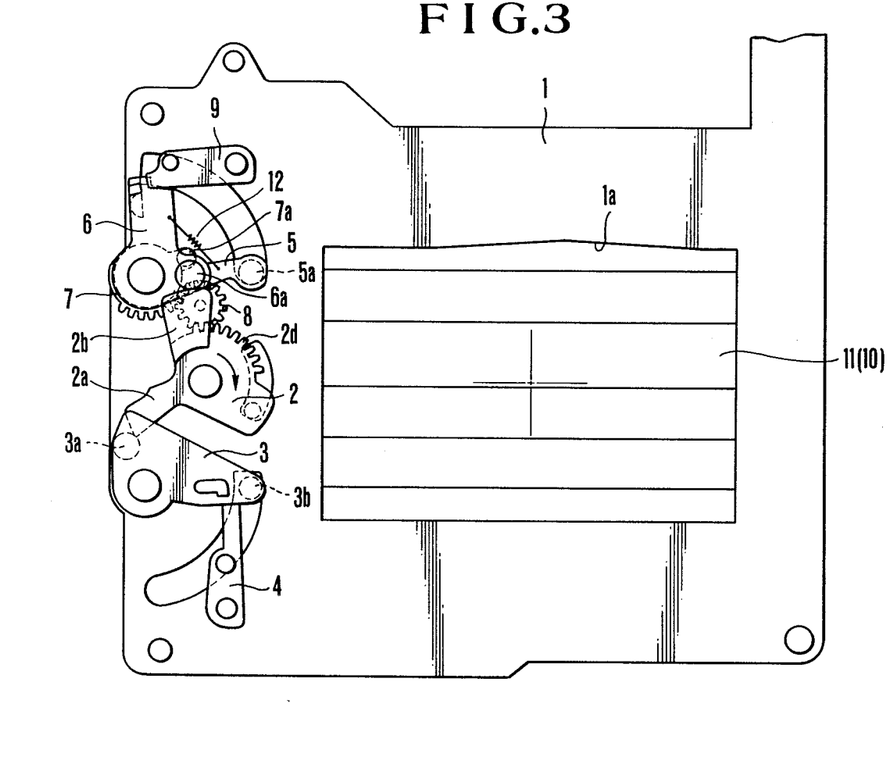
FIG. 3 is a front view of the shutter which is in the state of charging completed.

During this time, the leading blade group drive lever 3 with the foot portion 3a in contact with the leg portion 2a of the charge lever 2 is moved against the force of the spring 3d to, and held, in the position shown in FIG. 3. The leading blade group 10 which has engaged the foot portion 3b is in the position of covering the aperture 1a of the shutter base plate 1 (on the back side of the trailing blade group 11 as viewed in FIG. 3).

At this time, the foot portion 6a of the trailing blade group force-accumulating lever 6 comes into contact with the leg portion 2b of the charge lever 2, so that the charging is completed.

During this time, the trailing blade group drive lever 5 is pushed by the projected portion 7a of the double light-blocking formation lever 7 rotated by the gear 8 in mesh with the geared portion 2d of the charge lever 2 to the position of FIG. 3 where the running of the trailing blade group 11 is completed. At this time, with the help of the foot portion 5a, the trailing blade group 11 is held in the position of covering the aperture 1a of the shutter base plate 1.

That is, it is in the state shown in FIG. 3 that the leading blade group 10 and the trailing blade group 11 both cover the aperture 1a of the shutter base plate 1, thus establishing the double light-blocking condition.

Next, the operation of cancellation of the double light-blocking connection before actuation of a release will be described.

Figure 4:
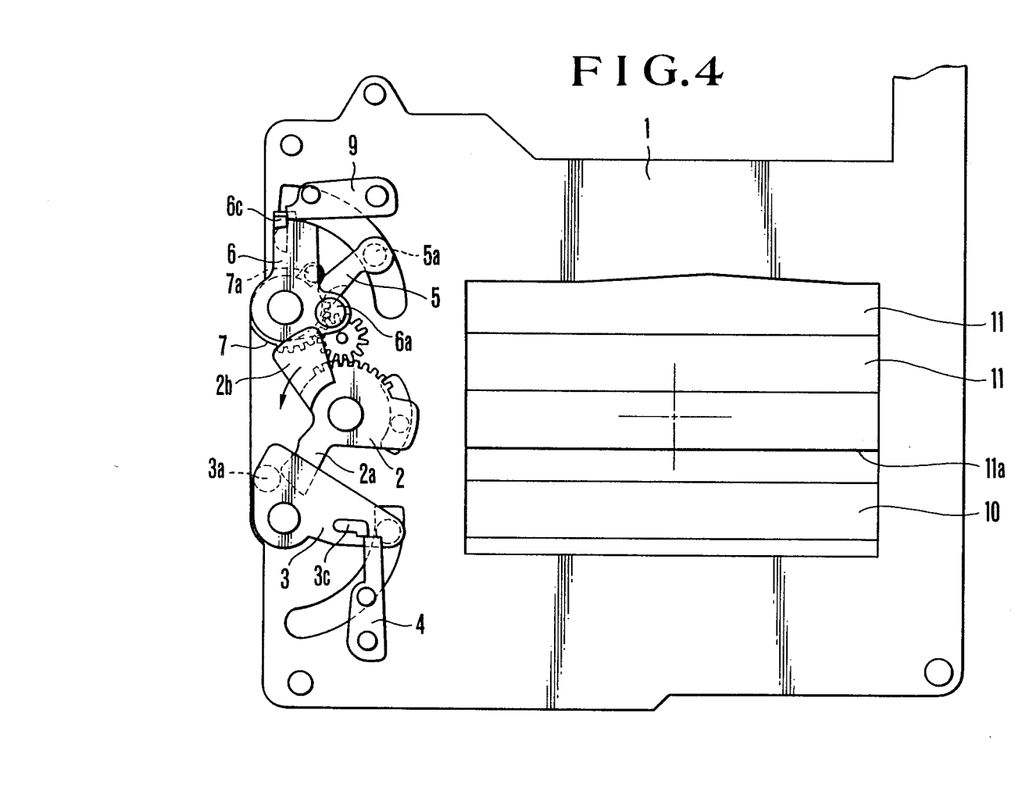
FIG. 4 is a front view of the shutter which is in the process fo cancellation of the double light-blocking.

With the shutter in the state shown in FIG. 3, when the photographer manipulates an operating member for cancelling the double light-blocking condition for example, pushes the release button to a first stroke position (for measuring the light, finding the distance), the charge lever 2 starts to rotate in the counterclockwise direction by the charge member (not shown) of the camera (for cancellation of the charging) (see FIG. 4). When the counterclockwise rotation of the charge lever 2 starts, the leg portion 2a disengages from the foot portion 3a of the leading blade group drive lever 3, and the projected portion 3c of the leading blade group drive lever 3 comes into contact with the leading latch lever 4. Thereby, the leading blade group drive lever 3 is hindered from turning in the clockwise direction under the action of the spring 3d, thus holding the ready-to-run position.

At this time, the foot portion 6a of the trailing blade group force-accumulating lever 6 is released from the abutting connection with the leg portion 2b of the charge lever 2, and the projected portion 6c of the trailing blade group force-accumulating lever 6 comes into contact with the trailing latch lever 9, thus hindering the trailing blade group force-accumulating lever 6 from turning in the clockwise direction under the action of the spring 6d.

Also, the double light-blocking formation lever 7 rotates in the counterclockwise direction as the charge lever 2 rotates in the counterclockwise direction. The trailing blade group drive lever 5 in abutting engagement with the projected portion 7a is caused by the spring 12 to follow up the lever 7. Therefore, the lever 5 rotates in the counterclockwise direction, thus moving in a direction to come into contact with the trailing blade group force-accumulating lever 6. As the trailing blade group drive lever 5 turns in the counterclockwise direction, the trailing blade group 11 in engagement with the foot portion 5a of the trailing blade group drive lever 5 moves from the position where it has covered the aperture 1a of the shutter base plate 1 toward an upper portion 1f of the shutter base plate 1 (see FIG. 1).

Figure 5:
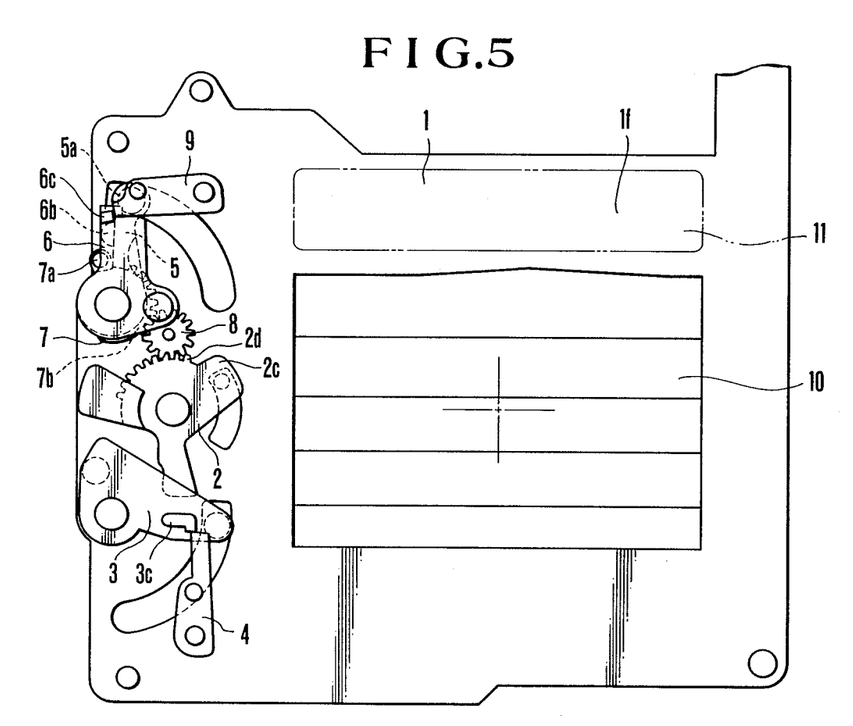
FIG. 5 is a front view of the shutter which is in the state of completion of the cancellation of the double light-blocking.

As the counterclockwise rotation of the charge lever 2 further advances, the double light-blocking formation lever 7 arrives at the position shown in FIG. 5. At this time, the trailing blade group drive lever 5 is released from the engagement with the double light-blocking formation lever 7, and comes into contact with the foot portion 6b of the trailing blade group force-accumulating lever 6. Then, the trailing blade group 11 engaging with the foot portion 5a of the trailing blade group drive lever 5 is completely retracted from the aperture 1a, taking its place behind the upper portion 1f of the shutter base plate 1.

That is, the double light-blocking is cancelled in the state of FIG. 5. Thus, in a state just before the shutter is released, the leading blade group 10 alone covers the aperture 1a.

With the shutter in the state of FIG. 5, when the photographer carries out a releasing operation, for example, further pushes the release button to the second stroke, the actuating device (electromagnet) (not shown) turns the leading and trailing latch levers 4 and 9 clockwise in the predetermined timing to disengage from the projected portion 3c of the leading blade group drive lever 3 and the projected portion 6c of the trailing blade group force-accumulating lever 6. Then, the leading blade group drive lever 3 and the trailing blade group force-accumulating lever 6 (while pushing the trailing blade group drive lever 5) are turned in the clockwise direction by the forces of the springs 3d and 6d respectively, causing the leading and trailing blade groups 10 and 11 to run to the position of FIG. 1.

Now, suppose after the double light-blocking has been cancelled (see FIG. 5), the releasing operation is given up (or though having intended to shoot, the photographer gets stopped from making an exposure, for example, removes his finger from the depression of the release button to the first stroke without doing the further depression to the second stroke), then the shutter operates as follows:

When the releasing operation is abandoned, the charge lever 2 is rotated in the clockwise direction from the position of FIG. 5 as its leg portion 2c is pushed by the charge member (not shown). Such clockwise movement of the charge lever 2 causes counterclockwise movement of the gear 8, since the gear 8 is in mesh with the geared portion 2d. This in turn causes clockwise movement of the double light-blocking formation lever 7 since it has the geared portion 7d in mesh with the gear 8. As the double light-blocking formation lever 7 is rotating in the clockwise direction, the trailing blade group drive lever 5 is pushed by the projected portion 7a and starts to turn in the clockwise direction against the force of the spring 12. On further clockwise movement of the charge lever 2 up to the charging completion position, the stage of FIG. 3 occurs. As has already been described, the double light-blocking condition of FIG. 3 is established.

As has been described above, in the present embodiment the trailing blade group drive lever is substantially divided into two parts and the double light-blocking formation lever is supplemented and arranged to cooperate with the charge lever. Despite the construction of the shutter in such a simple form, when the shutter is set ot the double light-blocking state when the charging is completed, and then has to be released from the double light-blocking state just before the exposure is made, even if the releasing operation is interrupted, the repetition of the charging only returns the shutter to the double light-blocking state without having to have the sound of running of the trailing blade group. Thus, it has been made possible to realize a shutter which, despite the interruption of a shooting, does not produce a sound as if the shutter is released, and, because the shock due to the running of the trailing blade group does not take place, there is no durability problem.

What is claimed is:

1. A shutter having a leading blade group drive member for driving a leading blade group and a trailing blade group drive member for driving a trailing blade group, comprising:
   (a) a trailing blade group force accumulating member, engaged with the trailing blade group drive member, for pushing the trailing blade group drive member in a shutter running direction, said trailing blade group force accumulating member being movably supported;
   (b) a charge member, engaged with said trailing blade group force accumulating member, for moving said trailing blade group force accumulating member from a running completion position to a running preparation position; and
   (c) a drive mechanism, engaged with the trailing blade group drive member and with said charge member, for moving the trailing blade group drive member, in response to movement of said charge member, to one of a double light-blocking state where an aperture of the shutter is covered by both of the leading blade group and the trailing blade group, and a double light-blocking cancelling state where the aperture is covered by only the leading blade group.

2. A shutter according to claim 1, wherein said drive mechanism includes a double light blocking formation member arranged to move in response to movement of said charge member, said double light blocking formation member driving the trailing blade group drive member in the shutter running direction when said trailing blade group force accumulating member moves from said running completion position to said running preparation position.

3. A shutter according to claim 2, wherein said double light blocking formation member has portion which allows the trailing blade group drive member to return in a direction opposite the shutter running direction in response to a movement of said charge member.

4. A shutter according to claim 1, wherein said charge member includes a portion engaged with the leading blade group drive member, which portion, when said charge member moves said trailing blade group force accumulating member from the running completion position of said shutter to the running preparation position, moves at the same time the leading blade group drive member from a running completion position to a running preparation position.

5. A shutter according to claim 2, further comprising a spring for biasing together the trailing blade group drive member and said trailing blade group force accumulating member, and wherein the trailing blade group drive member comes into contact with said trailing blade group force accumulating member when said double light blocking formation member does not drive the trailing blade group drive member in the shutter running direction.

6. A shutter according to claim 1, wherein the trailing blade group drive member and said trailing blade group force accumulating member are supported rotatably around a common axis.

7. A shutter according to claim 2, wherein the trailing blade group drive member, said trailing blade group force accumulating member, and said double light blocking formation member are supported rotatably around a common axis.

8. A shutter according to claim 2, further including a gear engaged with said charge member and said double light-blocking formation member, for transmitting force from said charge member to said double light blocking formation member.

9. A shutter according to claim 1, further comprising:
   a leading latch member for latching the leading blade group drive member in a running preparation position; and
   a trailing latch member for latching the trailing blade group drive member in a running preparation position.

10. A shutter having a leading blade group drive member for driving a leading blade group and a trailing blade group drive member for driving a trailing blade group, comprising:
    a charge member, engaged with the leading blade group drive member, for charging the leading blade group drive member from a running completion position to a running preparation position by rotation in a first direction, and for cancelling the charging of the leading blade group drive member by rotation in a second direction; and
    a double light-blocking drive mechanism, engaged with said trailing blade group drive member and with said charge member, for moving the trailing blade group drive member to a double light-blocking position wherein both of the leading blade group and the trailing blade group block an aperture when said charge member is rotated in the first direction, and for moving said trailing blade group drive member away from the double-light blocking position when said charge member is rotated in the second direction.

11. A shutter according to claim 10, wherein said double light-blocking drive mechanism includes a double light-blocking formation lever arranged to move in response to movement of said charge member, said double light-blocking formation lever moving the trailing blade group drive member to the double-light blocking position in response to rotation of said charge member in the first direction.

12. A shutter according to claim 11, wherein said double light-blocking formation lever has a portion which allows the trailing blade group drive member to move in a direction away from the double light-blocking position in response to rotation of said charge member in said second direction.

13. A shutter according to claim 11, wherein the trailing blade group drive member and said double light-blocking formation lever are supported rotatably around a common axis.

14. A shutter according to claim 11, further including a gear, engaged with said charge member and said double light-blocking formation lever, for transmitting force from said charge member to said double light-blocking formation lever.

15. A shutter according to claim 10, further comprising:
    a leading latch member for latching the leading blade group drive member in the running preparation position; and
    a trailing latch member for latching the trailing blade group drive member in a running preparation position.

* * * * *

UNITED STATES PATENT AND TRADEMARK OFFICE
CERTIFICATE OF CORRECTION

PATENT NO. : 4,977,421

DATED : December 11, 1990

INVENTOR(S) : FUKUDA

It is certified that error appears in the above-identified patent and that said Letters Patent is hereby corrected as shown below: Title page:

Between Items [22] and [51]:

Insert: --[30] Foreign Application Priority Data
                   Sept. 28, 1988 [JP] Japan . . . 63-245558--.

COLUMN 2

Line 62, "showw)" should read --shown)--.
   Line 67, "force" should read --force from--.

COLUMN 6

Line 18, "stage" should read --state--.
   Line 27, "ot" should read --to--.

Signed and Sealed this

Twenty-fifth Day of June, 1991

*Attest:*

HARRY F. MANBECK, JR.

*Attesting Officer*        *Commissioner of Patents and Trademarks*